Oct. 7, 1930.  J. W. WILDERMUTH  1,777,456
LIP TILE AND MOUNTING THEREFOR

Filed Sept. 8, 1927

Inventor
Jesse W. Wildermuth
By Frank Fraser
Attorney

Patented Oct. 7, 1930

1,777,456

UNITED STATES PATENT OFFICE

JESSE W. WILDERMUTH, OF LANCASTER, OHIO, ASSIGNOR TO LIBBEY-OWENS-FORD GLASS COMPANY, OF TOLEDO, OHIO, A CORPORATION OF OHIO

LIP TILE AND MOUNTING THEREFOR

Application filed September 8, 1927. Serial No. 218,180.

The present invention relates to an improved lip tile and mounting therefor adapted for use in sheet glass apparatus.

An important object of the invention is to provide in sheet glass apparatus, a lip tile and an adjustable mounting therefor.

Another object of the invention is to provide in a sheet glass apparatus, a lip tile pivotally supported whereby one end of the tile may be adjusted to control the position of the opposite end.

Another object of the invention is to provide in sheet glass apparatus, a receptacle containing a mass of molten glass from which a sheet may be formed, and a tile pivotally mounted on a portion of said receptacle with means being associated with said tile to move one end thereof to and from the surface of the mass of molten glass.

A still further object of the invention is to provide an apparatus wherein a sheet of glass may be continuously formed from a mass of molten glass contained in a suitable working receptacle, the apparatus including a lip tile pivotally mounted on blocks supported on the end of said working receptacle, and an adjusting mechanism associated with the outer end of said tile whereby the tile may be pivoted on the blocks supporting the same to move the inner end of said tile to and from the surface of the molten glass contained in said receptacle.

Other objects and advantages of the invention will become more apparent during the course of the following description when taken in connection with the accompanying drawings.

Figure 1:
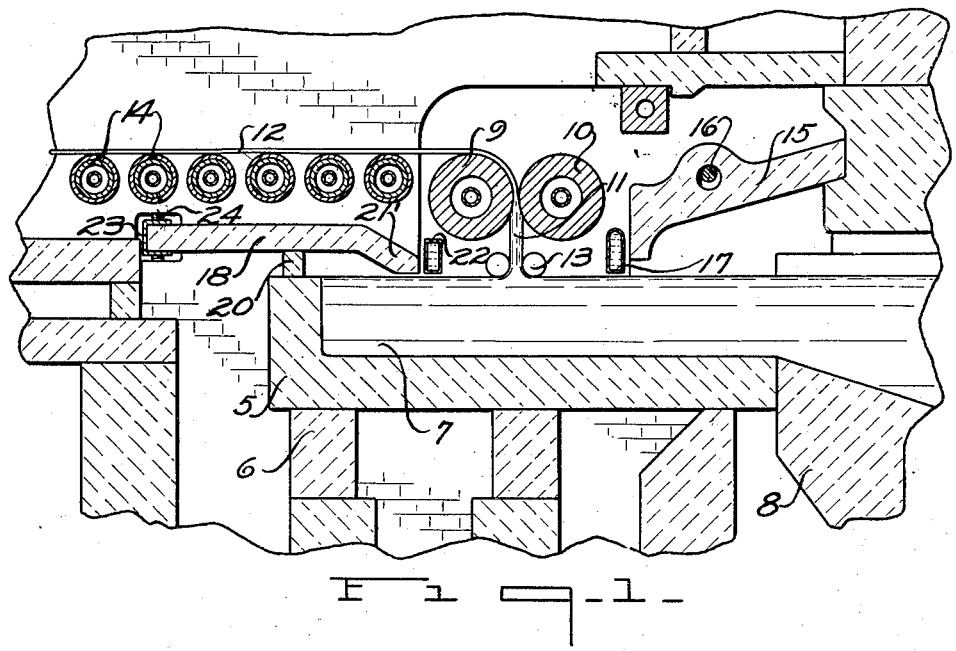
Figure 2:
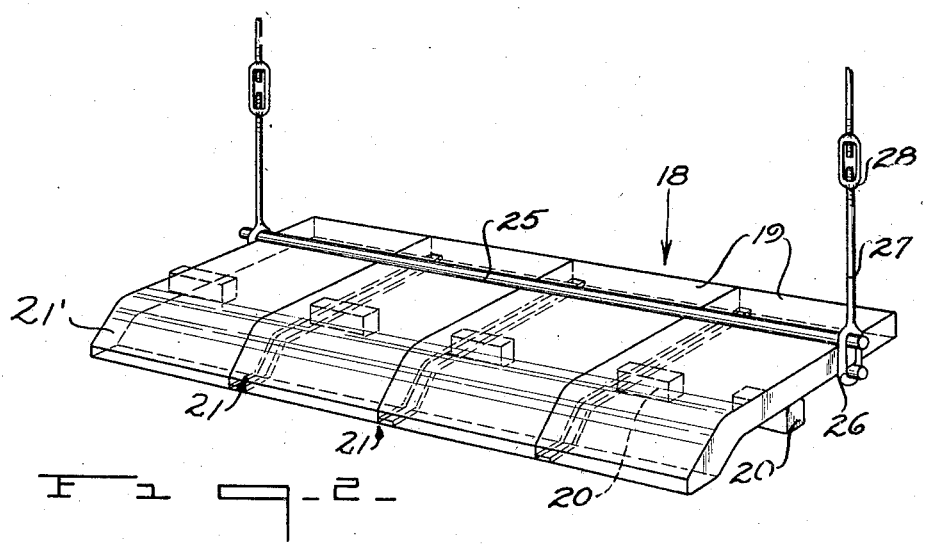

In the drawings wherein like numerals are employed to designate like parts throughout the same, Fig. 1 is a vertical longitudinal section through a sheet glass machine illustrating one form of the invention, and Fig. 2 is a perspective detail view of the lip tile and another form of mounting therefor.

This invention is an improved form of supporting an adjusting means for the type of lip tile disclosed in the application of Drake and Mambourg, Serial No. 214,278, filed August 20, 1927.

The numeral 5 designates a receptacle supported in a suitably heated compartment upon the stools 6, the said receptacle containing a mass of molten glass 7 which may be supplied continuously from any desired type of melting tank 8. In the type of machine disclosed, a pair of rolls 9 and 10 respectively are mounted above the surface of the molten glass 7, and so arranged as to create a sheet forming pass whereby a relatively heavy mass of molten glass 11 may be moved upwardly from the source 7 to the sheet forming pass where it is reduced or rolled into a sheet 12 having a predetermined thickness. Suitable feed means or edge engaging means 13 may be used to assist in building up the desired thickness of mass 11. The sheet 12, after it has been rolled from the mass 11, is preferably deflected over the roll 9 so that the sheet may be passed in a horizontal position through an annealing leer as is well understood in the art. Supporting and conveying rolls 14 may be used for taking care of the sheet 12 in its horizontal run, and the peripheral speed of the rolls 14 is preferably such that the sheet will be placed under a slight tension to prevent sagging thereof.

Arranged on one side of the mass 11 is a lip tile 15 supported on a suitable hanging bracket 16, while a heat absorbing shield 17 is associated therewith as illustrated. The tile 15 and shield 17 protects the mass 11, forming rolls, and associated parts from the heat and gases issuing from the furnace 8.

On the opposite side of the mass 11, an improved lip tile, disclosed in the copending application above mentioned, is used because of the nearness of the sheet to the mass of molten glass.

The building up of the mass 11 is dependent upon the viscosity of the glass 7 and operation and temperature control of the rolls 9 and 10 and associated parts. It is practically impossible to maintain the temperature and thus the viscosity of the glass constant at all times so that therefore it is necessary to make suitable adjustments where possible. In accordance with the present invention it is possible to control the temperature of the glass 7 in the receptacle 5 to a greater extent than heretofore, and this is made possible by adjustably mounting the tile 18. It will be appreciated that the space between the rolls 14 and the molten glass 7 is relatively small. However, with the present construction of tile, it is possible to adjust the tile 18 within relatively wide limits, thus permitting an accurate control of the molten glass 7.

The tile, designated in its entirety by the numeral 18, preferably comprises a plurality of sections 19 having cooperating edges 21 so that the sections may be associated to form a single tile. Any desired connection or cooperating parts may be used to join the sections 19.

The tile is preferably pivotally supported on suitable blocks 20 which rest upon the closed end of the working receptacle 5 as illustrated in Fig. 1, the blocks being preferably spaced and arranged under the joints between adjacent sections 19. Heat coming from the compartment in which the pot is supported is allowed to pass up and under the lower surface of the tile 18, being directed upon the surface of the molten glass 7 by means of the end 21' of said tile. It will be noted that the blocks 20 are arranged in spaced relation, thus providing therebetween passageways or flues through which the heated air and gases may pass. The intensity of the heat upon the surface of the glass near the closed end of the receptacle has a considerable bearing on the formation of the mass 11. However, to protect the mass 11 from the heat applied to the surface of the glass, a shield 22 is provided, and its lower edge is preferably arranged very close to the surface of the molten glass, thus preventing an appreciable escape of heat.

To control the intensity of the heat, the tile is adjustably mounted so that it may be rocked about the supporting blocks 20. In Fig. 1 a U member 23 is arranged across the ends of sections 19, which U member is connected to a suitable adjustable threaded shaft or the like 24 to permit vertical adjustment thereof.

In Fig. 2 a modified construction is shown wherein transverse bars or rods 25 are arranged on either side of the slab 18, which bars are received in suitable eyes 26 at their ends, the eyes being carried by vertically adjustable shafts 27. Turn buckles 28 or any other suitable adjusting means may be provided to move the shaft 27 up or down as desired. Upon movement of the shaft 27 and rods 25, it will be seen that as the tile is pivotally supported on the blocks 21, the inner end 21' of the tile will be moved to and from the molten glass 7.

Attention is also called to the fact that the position of the rolls 9 and 10 may be varied as desired, and although the rolls are shown a substantial distance above the surface of the glass 7, rolls may be used where their peripheries touch or contact with the surface of the molten glass. However, the present invention does not relate to any particular location of the sheet forming rolls, but refers to the construction and mounting for an improved lip tile adapted to assist in the proper conditioning of the molten glass from which the sheet is produced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a receptacle containing a mass of molten glass, means for forming a sheet therefrom, means for heating the receptacle, a tile, supporting means contacting with the tile at spaced points and about which the tile is pivotally movable, the supporting means forming heat conducting passageways between the points where it contacts with the tile and through which heated gases may pass from the receptacle heating means, and means for rocking the tile about its pivotal support.

2. In sheet glass apparatus, a receptacle containing a mass of molten glass, means for forming a sheet therefrom, means for heating the receptacle, a tile, a plurality of spaced tile supporting means resting on the receptacle and on which the tile is pivotally supported, the spaces between the supporting means forming flues through which heated gases may pass from the receptacle heating means when the tile is in operative position, and means for moving the tile about its pivotal support.

3. In sheet glass apparatus, a receptacle containing a mass of molten glass, means for forming a sheet therefrom, means for heating the receptacle from beneath, a tile, a plurality of spaced tile supporting means resting on the receptacle and on which the tile is pivotally supported, the spaces between the supporting means forming flues through which heated gases may pass from the receptacle heating means when the tile is in operative position, and means for raising and lowering the outer end of the tile to control the position of the inner end thereof with respect to the surface of the mass of molten glass.

4. In sheet glass apparatus, a receptacle containing a mass of molten glass, means for forming a sheet therefrom, a heating compartment beneath the receptacle, a tile, a plurality of spaced tile supporting means resting on the receptacle and on which the tile is pivotally supported, the spaces between the supporting means forming flues through which heated gases may pass from the heating compartment when the tile is in operative position, and means for raising and lowering the outer end of the tile to control the position of the inner end thereof with respect to the surface of the mass of molten glass, the inner end of the tile terminating in a downwardly extending lip.

5. In sheet glass apparatus, a receptacle containing a mass of molten glass, means for forming a sheet therefrom, a plurality of blocks mounted in spaced relation on the end of said receptacle, a tile supported on and pivotal about said blocks, means for moving one end of the tile to control the position of the opposite end thereof, and means for heating the receptacle containing the mass of molten glass, a portion of the heat passing between the spaced blocks acting upon the surface of the glass in the receptacle.

6. In sheet glass apparatus, a receptacle containing a mass of molten glass, means for forming a sheet therefrom, a heating compartment beneath said receptacle, a tile, a plurality of spaced supporting elements resting upon the receptacle for supporting said tile intermediate its ends, the spaces between said supporting elements forming flues in communication with the heating compartment so that a portion of the heat from said compartment can pass through said flues beneath the tile, and means for rocking the tile upon the spaced supporting elements.

Signed at Lancaster, in the county of Fairfield and State of Ohio, this third day of September, 1927.

JESSE W. WILDERMUTH.